US009991939B2

(12) United States Patent
Mundarath et al.

(10) Patent No.: US 9,991,939 B2
(45) Date of Patent: Jun. 5, 2018

(54) MULTI-USER MIMO-SDMA FOR FINITE RATE FEEDBACK SYSTEMS

(71) Applicant: Apple Inc., Cupertino, CA (US)

(72) Inventors: Jayakrishnan Mundarath, Austin, TX (US); Jayesh Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 14/976,880

(22) Filed: Dec. 21, 2015

(65) Prior Publication Data

US 2016/0191125 A1     Jun. 30, 2016

Related U.S. Application Data

(63) Continuation of application No. 13/888,094, filed on May 6, 2013, now Pat. No. 9,225,398, which is a
(Continued)

(51) Int. Cl.
*H04B 7/0417* (2017.01)
*H04B 7/06* (2006.01)
(Continued)

(52) U.S. Cl.
CPC ......... *H04B 7/0417* (2013.01); *H04B 7/0632* (2013.01); *H04B 7/0634* (2013.01);
(Continued)

(58) Field of Classification Search
USPC .................................. 375/221, 267; 455/221
See application file for complete search history.

(56) References Cited

U.S. PATENT DOCUMENTS 5,909,649 A    6/1999 Saunders et al.
6,473,467 B1   10/2002 Wallace et al.
(Continued)

FOREIGN PATENT DOCUMENTS

EP    1453262 A1    1/2004

OTHER PUBLICATIONS

N. Jindal, "Finite Rate Feedback MIMO Broadcast Channels," Feb. 2006 ita.ucsd.edu/workshop/06/talks/papers/79.pdf.
(Continued)

*Primary Examiner* — Eva Puente
(74) *Attorney, Agent, or Firm* — Meyertons, Hood, Kivlin, Kowert & Goetzel, P.C.

(57) ABSTRACT

A multi-user MIMO downlink beamforming system with limited feedback (200) is provided to enable precoding for multi-stream transmission, where a channel codeword ($u_i$) and one or more channel quality indicator values ($CQI_A$, $CQI_B$) are computed at the user equipment (201.*i*) on the basis of maximizing a predetermined SINR performance metric ($\rho_i$) which estimates the receive signal-to-noise-ratio (SINR) at the user equipment (201.*i*). The computed codeword ($u_i$) and CQI values (or differential values related thereto) are quantized and fed back to help the base station (210) which applies a correction to the appropriate CQI value in the course of designing the transmit beamforming vectors w and determining the appropriate modulation and coding level to be used for downlink data transmission.

20 Claims, 4 Drawing Sheets

Related U.S. Application Data continuation of application No. 13/311,336, filed on Dec. 5, 2011, now Pat. No. 8,437,422, which is a continuation of application No. 11/620,203, filed on Jan. 5, 2007, now Pat. No. 8,073,069.

(51) Int. Cl.

| | | |
|---|---|---|
| *H04B 7/08* | (2006.01) | |
| *H04L 5/14* | (2006.01) | |
| *H04W 88/02* | (2009.01) | |
| *H04W 88/08* | (2009.01) | |

(52) U.S. Cl.
CPC ........... *H04B 7/086* (2013.01); *H04B 7/0857* (2013.01); *H04L 5/14* (2013.01); *H04W 88/02* (2013.01); *H04W 88/08* (2013.01)

(56) References Cited

U.S. PATENT DOCUMENTS

| | | | |
|---|---|---|---|
| 6,968,092 | B1 | 11/2005 | Winger |
| 7,110,463 | B2 | 9/2006 | Wallace et al. |
| 7,139,328 | B2 | 11/2006 | Thomas et al. |
| 7,151,809 | B2 | 12/2006 | Ketchum et al. |
| 7,164,649 | B2 | 1/2007 | Walton et al. |
| 7,505,527 | B2 | 3/2009 | Hwang et al. |
| 7,602,837 | B2 | 10/2009 | Kotecha et al. |
| 7,782,573 | B2 * | 8/2010 | Zhou .................... H04B 7/0417 360/260 |
| 8,064,532 | B2 * | 11/2011 | Maltsev ............... H04B 7/0634 370/203 |
| 8,743,991 | B2 | 6/2014 | Khojastepour |
| 2004/0066761 | A1 | 4/2004 | Giannakis et al. |
| 2004/0076224 | A1 | 4/2004 | Onggosanusi et al. |
| 2004/0108944 | A1 | 6/2004 | Lee et al. |
| 2004/0228423 | A1 | 11/2004 | Gueguen |
| 2005/0009476 | A1 | 1/2005 | Wu et al. |
| 2005/0043031 | A1 | 2/2005 | Cho et al. |
| 2005/0101259 | A1 | 5/2005 | Tong et al. |
| 2005/0117660 | A1 | 6/2005 | Vialle et al. |
| 2005/0129137 | A1 | 6/2005 | Yamada et al. |
| 2005/0201296 | A1 | 9/2005 | Vannithamby et al. |
| 2006/0072677 | A1 | 4/2006 | Kwak et al. |
| 2006/0092054 | A1 | 5/2006 | Li et al. |
| 2006/0093065 | A1 | 5/2006 | Thomas et al. |
| 2006/0120478 | A1 | 6/2006 | Kim et al. |
| 2006/0121946 | A1 | 6/2006 | Walton et al. |
| 2006/0155534 | A1 | 7/2006 | Lin et al. |
| 2006/0155798 | A1 | 7/2006 | Ketchum et al. |
| 2006/0255989 | A1 * | 11/2006 | Kim ..................... H04L 1/0026 341/120 |
| 2006/0279460 | A1 | 12/2006 | Yun et al. |
| 2007/0066571 | A1 | 3/2007 | Stockel et al. |
| 2007/0070967 | A1 | 3/2007 | Yang et al. |
| 2007/0071147 | A1 | 3/2007 | Sampath et al. |
| 2007/0099571 | A1 | 5/2007 | Withers, Jr. et al. |
| 2007/0127608 | A1 | 6/2007 | Scheim et al. |
| 2007/0147535 | A1 | 6/2007 | Niu et al. |
| 2007/0195974 | A1 | 8/2007 | Li et al. |
| 2007/0207828 | A1 * | 9/2007 | Cheng .................. H04W 52/40 455/522 |
| 2007/0211813 | A1 | 9/2007 | Talwar et al. |
| 2007/0223619 | A1 | 9/2007 | Lee et al. |
| 2007/0249296 | A1 | 10/2007 | Howard et al. |
| 2007/0286304 | A1 | 12/2007 | Kim et al. |
| 2007/0297528 | A1 | 12/2007 | Feder et al. |
| 2008/0013610 | A1 * | 1/2008 | Varadarajan .......... H04B 7/0417 375/221 |
| 2008/0056414 | A1 | 3/2008 | Kim et al. |
| 2008/0075058 | A1 | 3/2008 | Mundarath et al. |
| 2008/0076370 | A1 | 3/2008 | Kotecha et al. |
| 2008/0080449 | A1 | 4/2008 | Huang et al. |
| 2008/0080459 | A1 | 4/2008 | Kotecha et al. |
| 2008/0118008 | A1 | 5/2008 | Kotecha |
| 2009/0190688 | A1 | 7/2009 | Kotecha et al. |
| 2009/0274220 | A1 * | 11/2009 | Yun ....................... H04L 1/0026 375/244 |
| 2010/0202553 | A1 | 8/2010 | Kotecha et al. |
| 2013/0040705 | A1 | 2/2013 | Khojastepour |
| 2013/0322361 | A1 * | 12/2013 | Ko ....................... H04B 7/0632 370/329 |
| 2014/0016496 | A1 * | 1/2014 | Su ........................ H04B 7/0626 370/252 |
| 2015/0003359 | A1 * | 1/2015 | Hoshino ............... H04W 24/08 370/329 |

OTHER PUBLICATIONS

B. Hassibi, "An Efficient Square-Root Algorithm for BLAST," Proceedings of the 2000 IEEE International Conference on Acoustics, Speech and Signal Processing, Jan. 27, 2000.

A. Bourdoux et al., "Joint TX-RX Optimisation for MIMO-SDMA Based on a Null-space Constraint," IEEE Vehicular Technology Conference, vol. 1, 2002.

K. Wong et al., "Performance Enhancement of Multiuser MIMO Wireless Communication Systems," IEEE Transactions on Communications, vol. 50, No. 12, Dec. 2002.

Kim et al., U.S. Appl. No. 60/841,246, filed Aug. 31, 2006.

Wei et al., Tackling MIMO-OFDMA Feedback Load Through Feedback Encoding, IEEE Wireless Communication Systems, pp. 363-367 (Sep. 6-8, 2009).

B. Banister et al., "A Simple Gradient Sign Algorithm for Transmit Antenna Weight Adaptation with Feedback," IEEE Transactions on Signal Processing, vol. 51, No. 5, May 2003.

K. Huang et al., "Effect of Feedback Delay on Limited Feedback for Temporally Correlated Channels," Jul. 2006.

K. Huang et al., "Joint Beamforming and Scheduling for SDMA Systems with Limited Feedback," Jun. 2006.

K. Huang et al., "Limited Feedback for Temporally-Correlated Channels_ Feedback Rate and Delay," Mar. or Jun. 2006.

K. Huang et al., "Markov models for multi-antenna limited feedback systems," ICASSP, Jun. 2006.

K. Huang et al., "Multi-Antenna Limited Feedback for Temporally-Correlated Channels Feedback Compression," Jul. 2006.

K. Huang et al., "Orthogonal Beamforming in SOMA Downlink with Limited Feedback," Jul. 2006.

J.C Roh et al., "An Efficient Feedback Method for MIMO Systems with Slowly Time-Varying Channels," IEEE Communications Society, WCNC 2004.

N. Wei et al., Tackling MIMO-OFDMA Feedback Load Through Feedback Encoding, Sep. 6-8, 2009, IEEE Explore, pp. 363-367.

A. Goldmsmith et al., "Variable-Rate Variable-Power MQAM for Fading Channels," IEEE Transactions on Communications, vol. 45, No. 10, Oct. 1997.

D. Love, "Limited Feedback Unitary Precoding for Spatial Multiplexing Systems," IEEE Transactions on Information Theory, vol. 51, No. 8, Aug. 2005.

A. Goldsmith, The Capacity of Downlink Fading Channels with Variable Rate and Power, IEEE Transactions on Vehicular Technology, vol. 46, No. 3, Aug. 1997.

D. Love et al., "Feedback Methods for Multiple-Input Multiple-Output Wireless Systems," 2004.

P. Chow, "A Practical Discrete Multitone Transceiver Loading Algorithm for Data Transmission over Spectrally Shaped Channels," IEEE Transactions on Communications, vol. 43, No. 2/3/4, Feb./Mar./Apr. 1995.

R. Fischer et al., "A New Loading Algorithm for Discrete Multitone Transmission," Global Telecommunications Conference, GLOBECOM, 1996.

P. Xia et al., "Multiantenna Adaptive Modulation with Beamforming Based on Bandwidth-Constrained Feedback," IEEE Transactions on Communications, vol. 53, No. 3, Mar. 2005.

S.V. Bana et al., "Space Division Multiple Access (SOMA) for Robust Ad hoc Vehicle Communication Networks," The IEEE Fourth International Conference on Intelligent Transportation Systems, 2001 IEEE Intelligent Transportation Systems.

(56) References Cited

OTHER PUBLICATIONS

D.J. Love et al., "Grassmannian Beamforming on Correlated MIMO Channels," IEEE Global Telecommunications Conference, Nov. 3-Dec. 3, 2004.

A. Bourdoux et al., "Joint TX-RX Optimisation for MIMO-SDMA Based on a Null-space Constraint," 2002 IEEE 56th Vehicular Technology Conference.

D.J. Love et al., "Grassmannian Beamforming for Multiple-Input Multiple-Output Wireless Systems," IEEE, 2003.

A.F. Naguib et al., Performance of Wireless CDMA with M-ary Orthogonal Modulation and Cell Site Antenna Arrays, IEEE, Journal on Selected Areas in Communications, vol. 14, No. 9, Dec. 1996.

L. Dong et al., "Opportunistic Transmission Scheduling for Multiuser MIMO Systems," IEEE, 2003.

H. Shin et al., "Closed-form Formulas for Ergodic Capacity of MIMO Rayleigh Fading Channels," IEEE, 2003.

V. Zaharov et al., "Smart Antenna Application for Satellite Communication Systems with Space Division Multiple Access," Journal of Radio Electronics, N. 2, Feb. 5, 2001, printed Oct. 18, 2005.

M. Cooper et al., "Intelligent Antennas: Spatial Division Multiple Access," 1996 Annual Review of Communications.

G.J. Foschini et al., On Limits of Wireless Communication in a Fading Environment when Using Multiple Antennas, Wireless Personal Communications, vol. 6, 1998, pp. 311-335, http://www1.bell-labs.com/projecl/blasl/wpc-v6n3.pdf.

R. Monzingo et al., Introduction to Adaptive Arrays, Chapter 3, John Wiley & Sons, 1980, pp. 78-151.

M. Torlak et al., Fast Estimation of Weight Vectors to Optimize Multi-Transmitter Broadcast Channel Capacity, IEEE Transactions on Signal Processing, vol. 46, No. 1, Jan. 1998.

B. Clerckx, "Space-Time Signaling for Real-World MIMO Channels," Sep. 2005.

A. Goldsmith et al., Adaptive Coded Modulation for Fading Channels, IEEE Transactions on Communications, vol. 46, No. 5, May 1998.

Z. Hong et al., "Spalial Multiplexing in Correlated Fading via the Virtual Channel Representation." IEEE Journal on Selected Areas in Communication, Jun. 2003.

N. Khajehnouri el al., "Minimum Co-User Interference Approach for Multi-User MIMO Downlink Precoding," ICASSP 2006.

M. Vu et al., "MIMO Wireless Precoding," www.stanford.edu/-mhv/ SPM_MIMO _ Wireless _.Precoding.pdf.

\* cited by examiner

MULTI-USER MIMO-SDMA FOR FINITE RATE FEEDBACK SYSTEMS

CROSS-REFERENCE TO RELATED APPLICATIONS

This invention is a continuation application of U.S. patent application Ser. No. 13/888,094, entitled "Multi-User MIMO-SDMA for Finite Rate Feedback Systems", filed May 6, 2013, which is a continuation application of U.S. patent application Ser. No. 13/311,336, of the same title, filed Dec. 5, 2011, now U.S. Pat. No. 8,437,422, which is a continuation application of U.S. patent application Ser. No. 11/620,203, of the same title, filed Jan. 5, 2007, now U.S. Pat. No. 8,073,069, the disclosures of all of which are incorporated herein by reference as though fully and completely set forth herein.

BACKGROUND OF THE INVENTION

Field of the Invention

The present invention is directed in general to field of information processing. In one aspect, the present invention relates to a system and method for signal processing and control signaling for wireless MIMO communication systems.

Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed, such as Multiple Input Multiple Output (MIMO), which is a transmission method involving multiple transmit antennas and multiple receive antennas. For example, space division multiple access (SDMA) systems can be implemented as closed-loop systems to improve spectrum usage efficiency. SDMA has recently emerged as a popular technique for the next generation communication systems. SDMA based methods have been adopted in several current emerging standards such as IEEE 802.16 and the 3rd Generation Partnership Project (3GPP) Long Term Evolution (LTE) platform.

FIG. 1 depicts a wireless MIMO communication system 100 that employs SDMA. In MIMO systems, transmitters and receivers are both equipped with multiple antennas. The wireless communication system 100 includes one or more transmitters 101 (e.g., base stations) and one or more receiver stations 102.$l$-102.$m$ (e.g., subscriber stations), where "m" is an integer representing the number of receiver stations in a given geographic area. Base stations and subscriber stations can be both transmitters and receivers when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system 100. Subscriber systems can be virtually any type of wireless one-way or two-way communication device such as a cellular telephones, wireless equipped computer systems, and wireless personal digital assistants. The signals communicated between base stations and subscriber stations can include voice, data, electronic mail, video, and other data, voice, and video signals.

In an SDMA-MIMO wireless communication system, each base station 101 and subscriber station 102.$i$ includes an array of antennas for transmitting and receiving signals. In SDMA, different subscriber stations share the same time-frequency channel and the separation between them occurs in the spatial dimension. During transmission, the antenna array forms a beam or multiple beams by applying a set of transmit beam forming weights to signals applied to each antenna in the antenna array. A different set of transmit beam forming weights is applied by the base station to each communication with each subscriber station with a goal of minimizing interference between the radio communication devices signals. In some transmission schemes, such as time division duplex (TDD), beam forming between the base station and subscriber stations allows the allocation of the same frequency channel and different time channel to subscriber stations during downlink and uplink. In other transmission schemes, such as frequency division duplex (FDD), beam forming between the base station and subscriber stations allows the allocation of the same time channel and different frequency channel to subscriber stations during downlink and uplink.

As depicted more specifically in FIG. 1, the MIMO system base station 101 uses beamforming to transmit a single data stream (e.g., $s_1$) through multiple antennas, and the receiver combines the received signal from the multiple receive antennas to reconstruct the transmitted data. This is accomplished with "beamforming" weights whereby a signal $s_i$ is processed for transmission by applying a weight vector $w_i$ to the signal $s_i$ and transmitting the result $x_i$ over an array of antennas. The weighting vector $w_i$ is used to direct the signal with the objective of enhancing the signal quality or performance metric, like signal-to-interference-and-noise ratio (SINR) of the received signal. At the receiver, the received signals detected by the array of antennas are processed using a combining vector $v_i$. In particular, the base station 101 has an array of N antennas 105, where N is an integer greater than or equal to m. The base station prepares a transmission signal, represented by the vector $x_i$, for each signal $s_i$, where $i \in \{1, 2, \ldots, m\}$. (Note: lower case bold variables indicate vectors and upper case BOLD variables indicate matrices). The transmission signal vector $x_i$ is determined in accordance with Equation [1]:

$$x_i = w_i s_i \quad\quad\quad [1]$$

where $w_i$, is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 105. In addition, the term "$s_i$" is the data to be transmitted to the $i^{th}$ receiver. Each of the coefficients of weight vector $w_i$ may be a complex weight. Unless otherwise indicated, transmission beamforming vectors are referred to as "weight vectors," and reception vectors are referred to as "combining vectors," though in systems having reciprocal channels (such as TDD systems), a combining vector v at a receiver/subscriber station can be used as both a combining vector (when receiving signals from a transmitter/base station) and a weighting vector (when transmitting to a transmitter/base station).

The transmission signal vector $x_i$ is transmitted via a channel represented by a channel matrix $H_i$. The channel matrix $H_i$ represents a channel gain between the transmitter antenna array 105 and the receive antenna array 104.$i$ at the $i^{th}$ subscriber station 102.$i$. Thus, the channel matrix $H_i$ can be represented by a N×$k_i$ matrix of complex coefficients, where N is the number of antennas at the base station antenna array 105 and $k_i$ is the number of antennas in the $i^{th}$ subscriber station antenna array 104.$i$. The value of $k_i$ can be unique for each subscriber station. As will be appreciated, the channel matrix $H_i$ can instead be represented by a $k_i$×N matrix of complex coefficients, in which case the matrix manipulation algorithms are adjusted accordingly so that, for example, the right singular vector calculation on a N×$k_i$ channel matrix becomes a left singular vector calculation on a $k_i$×N channel matrix. The coefficients of the channel matrix $H_i$ depend, at least in part, on the transmission characteristics of the medium, such as air, through which a signal is transmitted. A variety of methods may be used to determine the channel matrix $H_i$ coefficients, such as transmitting a known pilot signal to a receiver so that the receiver, knowing the pilot signal, can estimate the coefficients of the channel matrix $H_i$ using well-known pilot estimation techniques. Alternatively, the actual channel matrix $H_i$ is known to the receiver and may also be known to the transmitter.

At the subscriber station 102.$i$, the transmitted signals are received on the $k_i$ receive antennas. For example, the transmission signal vector $x_i$ is transmitted via a channel represented by a channel matrix $H_1$, and is received at the receiver 102.$l$ as a receive signal vector $y_1 = H_1^H x_1 + n_1$ (where n represents noise and any co-channel interference caused by other subscriber stations). More specifically, the received signals for the $i^{th}$ subscriber station 102.$i$ are represented by a $k_i$×1 received signal vector $y_i$ in accordance with Equation [2]:

$$y_i = s_i^* H_i^H w_i + \left( \sum_{n=1}^{m} s_n^* H_i^H w_n - s_i^* H_i^H w_i \right) \quad [2]$$

where "$s_i$" is the data to be transmitted to the $i^{th}$ subscriber station 102.$i$, "$s_n$" is the data transmitted to the $n^{th}$ subscriber station 102.$n$, the * superscript denotes the complex conjugation operator, "$H_i^H$" represents the complex conjugate transpose of the channel matrix correlating the base station 101 and $i^{th}$ subscriber station 102.$i$, $w_i$ is the $i^{th}$ transmit weight vector, and $w_n$ is the $n^{th}$ transmit weight vector. The superscript "H" is used herein as a hermitian operator to represent a complex conjugate transpose operator. The $j^{th}$ element of the received signal vector $y_i$ represents the signal received on the $j^{th}$ antenna of subscriber station 102.$i$, $j \in \{1, 2, \ldots, k_i\}$. The first term on the right hand side of Equation [2] is the desired receive signal while the summation terms less the desired receive signal represent co-channel interference. Finally, to obtain a data signal, $z_i$, which is an estimate of the transmitted data the subscriber station 102.$i$ combines the signals received on the k antennas using a combining vector $v_i$ in accordance with Equation [3]:

$$z_i = \hat{s}_i = y_i^H v_i. \quad [3]$$

While the benefits of MIMO are realizable when the receiver 102 alone knows the communication channel, these benefits are further enhanced in "closed-loop" MIMO systems when the transmitter 101 has some level of knowledge concerning the channel response between each transmitter antenna element and each receive antenna element of a receiver 102.$i$. Precoding systems provide an example application of closed-loop systems which exploit channel-side information at the transmitter ("CSIT"). With precoding systems, CSIT can be used with a variety of communication techniques to operate on the transmit signal before transmitting from the transmit antenna array 105. For example, precoding techniques can be used at the base station 101 to provide a multi-mode beamformer function to optimally match the input signal on one side to the channel on the other side so that multiple users or subscriber stations can be simultaneously scheduled on the same time-frequency resource block (RB) by separating them in the spatial dimension. This is referred to as a space division multiple access (SDMA) system or as a multi-user (MU)-MIMO system. Additional examples of precoding include using a channel quality indicator (CQI) value measured at a receiver 102.$i$ to perform adaptive modulation and coding (AMC) on the transmit signal before transmission to the receiver 102.$i$.

While full broadband channel knowledge may be obtained at the transmitter 101 by using uplink sounding techniques (e.g., with Time Division Duplexing (TDD) systems), most precoded MIMO systems (e.g., with TDD or Frequency Division Duplexing (FDD) systems) use channel feedback techniques to measure channel information at the receiver 102.$i$ and then feed back the measured channel information to the transmitter 101. However, it is difficult to accurately measure the channel information or associated channel characteristics (such as SINR or channel quality information (CQI)) for a particular receiver when the communication status of other receivers in the vicinity is not known. In an SDMA system, this results from the fact that signal information being sent to other receivers can appear as interference or noise at the intended receiver 102.$i$, though the receiver can not be expected to have this knowledge when the channel characteristics are being measured.

Another difficulty associated with channel feedback techniques is the large overhead required for providing full channel feedback. One way of addressing this difficulty is to quantize the channel information prior to feedback. Usually, quantization is done by selecting a precoding codeword from a preset codebook known to both the transmitter and receiver, and sending only an index corresponding the selected codeword, thereby reducing the amount of feedback as compared to the high overhead of full channel feedback. However, the quantization techniques used in existing codebook systems to compress the channel feedback information can introduce inaccuracies in the feedback signal, causing losses in the zero-forcing/interference reduction properties of MU-MIMO beamforming. Feedback quantization also causes inaccuracies when the base station uses an estimate of the channel quality indicator (like SINR) that is computed at the receiver, which leads to loss in performance. Moreover, the limited feedback resources require that any practical system be designed to have a low feedback rate, and existing codebook systems can have unacceptably high feedback data rates.

Accordingly, there is a need for an improved system and methodology for signal processing and control signaling in a MIMO-SDMA system. There is also a need for a multi-user MIMO system which accurately estimates channel quality indicator information at a particular receiver without requiring knowledge of the other receivers or the base station scheduling algorithm. In addition, there is a need for a family of signal processing algorithms for selecting transmit and receive array vectors for MIMO-SDMA which overcomes quantization-related precoding errors and other problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
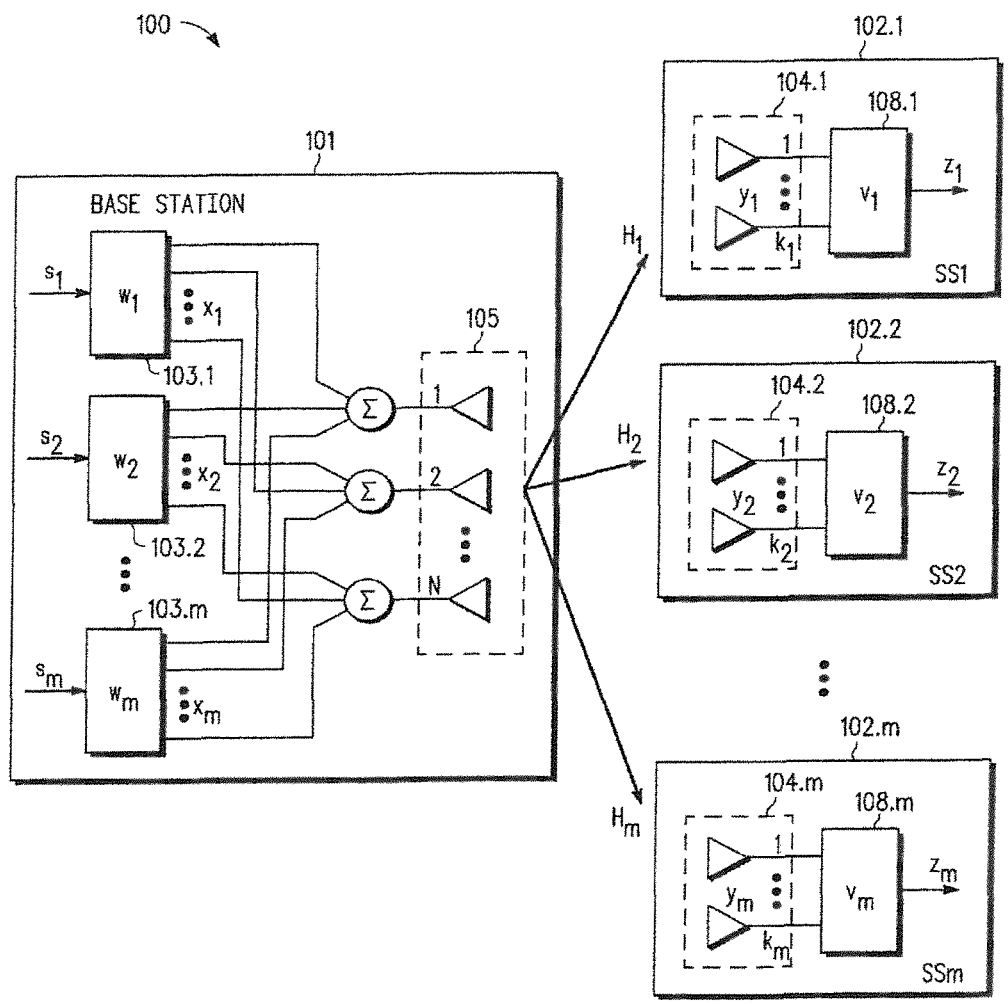
FIG. 1 (labeled prior art) depicts a wireless communication system.

A finite rate feedback system and methodology are described for use in efficiently providing precoder feedback in wireless, multi-user, multi-input, multiple output (MIMO) SDMA systems. Using codebook-based precoding techniques, multi-user beamforming transmission is enabled by accurately estimating and adjusting one or more CQI values for each receiver based upon the optimized receive beamforming vector designed at each receiver. In various example embodiments, a receiver estimates the CQI value(s) by jointly designing a receive beamforming vector v and selecting a corresponding codeword u=Hv which are optimized to correspond to the MIMO channel between the transmitter and the receiver. The receive beamforming vector v and corresponding codeword u may be optimized by maximizing a predetermined metric ρ for estimating the signal-to-interference-and-noise (SINR) or other CQI information detected at the receiver in a multi-user setting without any knowledge of the other users or the BS scheduling algorithm. Once the beamforming vector v and corresponding codeword u are computed, a first CQI value may be estimated by adjusting the predetermined metric ρ to reflect an assumption that there are no other receivers (and corresponding interference) in the same time-frequency resource block. Alternatively, the first CQI value may be estimated by adjusting the predetermined metric ρ to reflect an assumption that there are a minimum number of additional receivers, reflecting the case of minimum interference. In addition to the first CQI value, one or more additional CQI values may be estimated by adjusting the predetermined metric ρ to reflect an assumption that there are additional receivers (and corresponding interference) in the same time-frequency resource block. The estimated CQI value(s) (or differential information related thereto) and the selected codeword u are indexed using a codeword codebook (to quantize the codeword u) and CQI quantizer (to quantize the CQI value), and then fed back to the transmitter where they are dequantized. At the transmitter, the selected codewords $u_i$ fed back by each receiver are used to choose the appropriate transmit beamforming vectors $w_i$ for each receiver. In effect, each receiver proposes that the transmitter use the receiver's selected codeword u as the transmit beamforming vector w, but the transmitter may need to use a different transmit beamforming vector if the transmit beamforming design process requires a different vector in order to eliminate interference to other receivers. To the extent that the transmitter uses a different transmit beamforming vector w than the vector u proposed by the receiver, the transmitter adjusts the selected CQI value(s) from each receiver based on the actual transmit beamforming vectors $w_i$ to be used for transmission, and uses the adjusted CQI value(s) in performing adaptive modulation and coding on the data.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Figure 2:
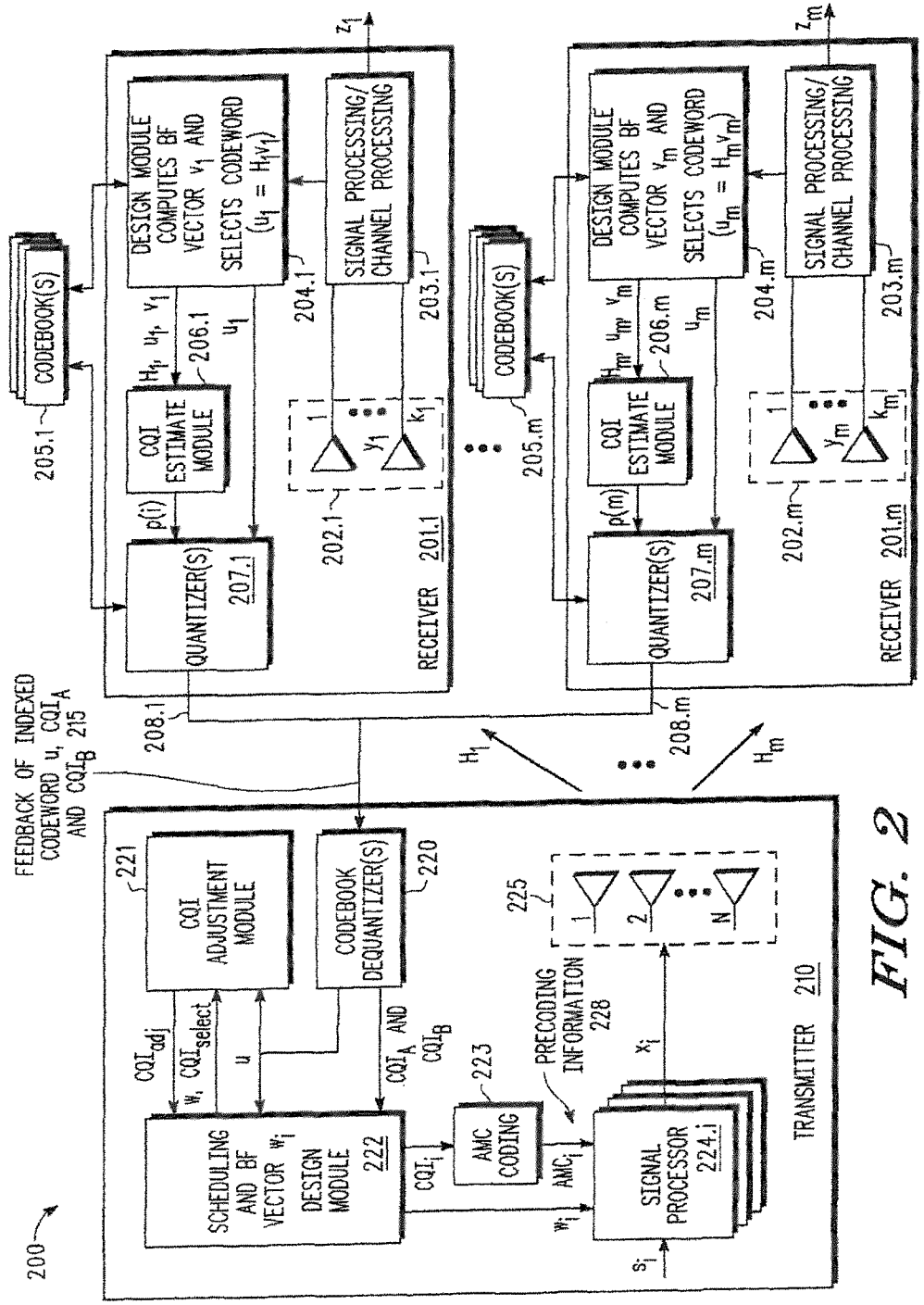
FIG. 2 depicts a wireless communication system in which limited feedback codebooks are used to design downlink beamforming vectors for each receiver station.

FIG. 2 depicts a wireless communication system 200 in which a transmitter 210 uses codebook-based techniques to design downlink beamforming vectors for precoding one or more input signals that are transmitted from a transmitter 210 (e.g., a base station) to one or more receivers 201.l-m (e.g., subscriber stations), where the precoder index is compressed in time at a receiver 201.i prior to feed back to a transmitter 210. The transmitter 210 includes an array 225 of one or more antennas for communicating with the receivers 201.l through 201.m, each of which includes an array 202.i having one or more antennas for communicating with the transmitter 210. In operation, a data signal vector $s_i$ presented at the transmitter 210 for transmission to the receiver 201.i is transformed by the signal processor 224.i into a transmission signal represented by the vector $x_i$. The signals transmitted from the transmit antenna 225 propagate through a matrix channel $H_i$ and are received by the receive antennas 202.i where they are represented by the vector $y_i$. For a MIMO channel from the transmitter 210 to the $i^{th}$ receiver 201.i, the channel is denoted by $H_i$, i∈{1, 2, ..., m}. The channel matrix $H_i$ may be represented as an N×$k_i$ matrix of complex entries representing the complex coefficients of the transmission channel between each transmit-receive antenna pair, where N represents the number of transmitter 210 antennas, and k represents the number of antennas of the $i^{th}$ receiver 201.i (or vice versa). At the receiver 201.i, the signal processing unit 203.i processes the $y_i$ signals received on the k antennas to obtain a data signal, $z_i$, which is an estimate of the transmitted data vector $s_i$. The processing of the received $y_i$ signals may include combining the $y_i$ signals with appropriate combining vector information $v_i$ retrieved from the codebook 205.i, where the combining vector information $v_i$ may be computed or chosen for each receiver 201.i using the receiver beamformer design methodology described herein.

Transmit beamforming or precoding at the transmitter may be implemented by having each receiver 201.$i$ determine its MIMO channel matrix $H_i$—which specifies the transmission channel between a transmitter and an $i^{th}$ receiver—in the channel estimation signal processing unit 203.$i$. For example, in a MIMO implementation, each receiver 201.$l$-$m$ determines its MIMO channel matrix $H_i$ by using pilot estimation or sounding techniques to determine or estimate the coefficients of the channel matrix $H_i$. Each receiver 201.$i$ uses the estimated MIMO channel matrix or other channel-related information (which can be channel coefficients or channel statistics or their functions, such as a precoder, a beamforming vector or a modulation order) to generate transmit beamforming weights or precoding information that is to be used to weight or precode the signals transmitted by the transmitter.

In accordance with selected embodiments described herein, transmit beamforming or precoding information is generated in part by first using the channel-related information to compute a receive or combining beamforming vector $v_i$ at each receiver 201.$i$ by maximizing a predetermined metric $\rho$ for estimating the received signal-to-interference-and-noise (SINR) as described more fully herein. The computed beamforming vector $v_i$ is used to select a vector codeword $u_i$ to represent/quantize the vector quantity $Hv_i$ which is fed back to the transmitter 210 for purposes of computing a transmit or weighting beamforming vector $w_i$ for each receiver 201.$i$ that corresponds to the combining beamforming vector $v_i$ computed at the receiver.

In one embodiment, a joint optimization approach may be used to design the receive beamforming vector $v_i$ and select the codeword $u_i$ from the codebook for a receiver 201.$i$ where the metric which is optimized is a CQI metric or SINR metric. In one embodiment, the predetermined SINR performance metric is given by $$\rho(v_i, u_i) = \frac{(P/K)|u_i^H Hv_i|^2}{1 + (K-1)(P/K)\|Hv_i\|^2(1/N_t)\left\|u_i - \frac{Hv_i}{\|Hv_i\|}\right\|^2},$$

where P is the maximum transmit SNR, K is the number of multiplexed users, $u_i$ is the selected codeword, H is the MIMO channel matrix, $v_i$ is the receive beamformer, and $N_t$ is the number of transmitter antennas, but other metrics can also be used. However, other approaches may be used to design the codeword $u_i$ and receive beamformer $v_i$. For example, substituting in the above expression $u_i$=H $v_i$, find the optimal $v_i$ for the resulting expression (denote it as $v_{i,\ opt}$), and then choose $u_i$=Q(H $v_{i,opt}$) where Q(·), is a quantizer function which finds the closest codeword to H $v_{i,opt}$ in the codebook. In another example, if a receive beamforming vector $v_i$ is independently designed (e.g., from the channel matrix information $H_i$), then a codeword $u_i$ may be selected or otherwise computed to represent the quantity $H_i\ v_i$. Alternatively, if the codeword $u_i$ is independently designed, then a receive beamforming vector $v_i$ may be selected based on the selected codeword.

In a selected embodiment for joint optimization of the beamforming vector $v_i$ and codeword $u_i$, the beamforming vector $v_i$ and codeword $u_i$ are jointly optimized at the receiver 201.$i$ by calculating, for each codebook entry u in the codebook 205.$l$, a corresponding plurality of candidate vectors $v_{\alpha,u}$ and choosing from this resulting plurality of candidate vectors $v_{\alpha,u}$, a particular vector denoted as $v_{opt,u}$ which maximizes a predetermined performance metric. The codebook entry u and corresponding vector $v_{opt,u}$ which maximize the predetermined performance metric are selected as the codeword $u_i$ and receive combining beamforming vector $v_i$, respectively, for that receiver station 201.$i$.

To illustrate this example embodiment with reference to the receiver 201.$i$ depicted in FIG. 2, the signal processing unit 203.$i$ first determines or estimates its MIMO channel matrix $H_i$. Using the channel information $H_i$, the vector design module 204.$i$ computes the receive beamforming vector $v_i$ and selects the codeword $u_i$ for receiver 201.$i$. This is done by first computing the receive beamforming vector $v_o$ that would be used if there were no feedback quantization error. In particular, the combining beamforming vector $v_o$ for the receiver 201.$i$ is derived from or is generated to be substantially equivalent to a right singular vector corresponding to the maximum singular value of the channel matrix between the transmitter 210 and the receiver 201.$i$ (e.g., $v_o$=RSVmax(Hi)). Next, each of a plurality of candidate codeword values are sequentially evaluated, starting with a first candidate codeword u that is selected from the codebook 205.$i$. The vector design module 204.$i$ uses the first candidate codeword u to compute a plurality of candidate vectors $v_{\alpha,u}$=($\alpha v_o$+(1−$\alpha$)$v_{F,u}$)/(∥($\alpha v_o$+(1−$\alpha$)$v_{F,u}$)∥), where 0≤$\alpha$≤1 and where $v_{F,u}$=$(H^HH)^{-1}H^Hu$(∥$(H^HH)^{-1}H^Hu$∥) The plurality of the candidate vectors $v_{\alpha,u}$ arises from different values of the parameter a within the range 0 to 1. The vector design module 204.$i$ then selects from the plurality of the candidate vectors $v_{\alpha,u}$, a particular receive beamformer vector, $v_{opt,u}$ which maximizes the predetermined SINR performance metric. In an example implementation, a candidate receive beamforming vector $v_u$ is selected as $v_u$=arg max 0≤$\alpha$≤1 $\rho(v_{\alpha,u})$, where the predetermined SINR performance metric is determined in accordance with Equation [4]:

$$\rho(v_{\alpha,u}) = \frac{(P/K)|u^H Hv_{\alpha,u}|^2}{1 + (K-1)(P/K)\|Hv_{\alpha,u}\|^2(1/N_t)\left\|u - \frac{Hv_{\alpha,u}}{\|Hv_{\alpha,u}\|}\right\|^2}, \quad [4]$$

where P is the maximum transmit SNR, K is the number of multiplexed users, u is the candidate codeword being evaluated, H is the MIMO channel matrix, $v_{\alpha,u}$ is the candidate receive beamformer being evaluated, and $N_t$ is the number of transmitter antennas. The vector design module 204.$i$ then selects the remaining codewords from the codebook 205.$i$ and computes the corresponding candidate receive beamformers, $v_{opt,u}$, using the criterion shown above. At this point, the vector design module 204.$i$ also selects the codeword u, by selecting the candidate codeword value and corresponding receive beamformer pair (u, $v_{opt,u}$) which maximizes a predetermined performance metric, where u is chosen from the codebook 205.$i$ and $v_{opt,u}$ is its corresponding candidate receive beamformer obtained from the above procedure. It should be noted that with this procedure, the chosen receive beamformer aligns very closely to the dominant channel mode, $v_o$, when the quantization error is small, while it aligns closer to $v_{F,u}$ when the quantization error is larger.

It is noted that u and v are obtained by optimizing the SINR metric in the above embodiment where the SINR metric is also a function of the number of users K. Thus the optimal u and v can be different for different K. In one embodiment, where the actual number of users K is not known a priori, the u which is fed back is calculated by assuming a fixed selected K, where K takes values from 1, 2, ..., $N_r$. If the knowledge K (and possibly w) is conveyed to the receiver after the transmission is scheduled, then the actual v used is updated using the SINR metric, the actual fed back u (or w if it was conveyed too) and K.

In addition to computing the receive or combining beamforming vector $v_i$, each receiver 201.i estimates channel-related information—such as a channel quality index (CQI) which may be the SINR based on an estimate of the interference expected at the receiver—which is then fed back to the transmitter 210 for use in scheduling and appropriate adaptive coding/modulation selection. However, by estimating the CQI information at the receiver 201.i before the transmitter has determined the final scheduling and coding, the receiver has no prior information about potential interference from other users that might affect the CQI. In addition, when the channel information is fed back in quantized form which in this case corresponds to codeword $u_i$, a quantization error is introduced that causes undesired interference which in turn affects the actual SINR. As a result of the foregoing, each receiver 201.i has to estimate the receive signal-to-noise-interference ratio SINRs without prior information about the other user's interference, and should also take into account the interference errors resulting from quantizing the channel feedback. As disclosed herein, this may be accomplished by having each receiver 201.9 estimate a first CQI based on the assumption that there is no interference from other receivers (e.g., for the case where a given receiver does not share a time-frequency resource block with any other receivers) or that there is minimum interference due to a minimum number of scheduled users and one or more additional CQIs based on the assumption that there will be interference from other additional receivers (e.g., for the case where a given receiver does share a time-frequency resource block with one or more receivers). For example, in the case of a minimum of two scheduled users in a 4×2 system, the first CQI may reflect the case when a minimum of two users are scheduled and the additional CQIs may reflect the cases when three or four users are scheduled. For a 2×2 system, only a single CQI value is fed back for the case when a minimum of two users are scheduled.

In accordance with selected embodiments of the present invention, the receive SINR $\rho(\cdot)$ for a user i may be estimated at the receiver 201.i with the algorithm of Equation [5]

$$\rho(v) = \frac{(P/K)|u^H H v|^2}{1+(K-1)(P/K)\|Hv\|^2(1/N_t)\left\|u-\frac{Hv}{\|Hv\|}\right\|^2}, \quad [5]$$

where P is the maximum transmit SNR, K is the number of multiplexed users, u is the selected codeword for the user, H is the MIMO channel matrix for the user, v is the receive beamformer for the user, and $N_t$ is the number of transmitter antennas. The second term of the denominator on the right hand side is the average interference seen by the SS in the presence of 'K' SS's grouped in the same time-frequency resource. However, in other embodiments the interference term can be calculated by other methods. Using Equation 5, the CQI estimation module 206.i can compute an estimated CQI for the case where zero interference is assumed by setting K=1, in which case second term of the denominator on the right hand side goes to 0. Similarly, to compute an estimated CQI for the case where there is interference from one additional receiver, the CQI estimation module 206.i can set K=2 and compute the value of Equation 5 to obtain the estimated SINR for the case where there is interference from an additional receiver. In this way, the CQI estimation module 206.i computes the estimated CQI to account for interference from any number of other receivers simply by adjusting the K term in Equation 5.

Rather than feeding back the entire scalar, vector or matrix representation of the precoding information (such as the selected codeword $u_i$ or the full CQI values which would require a large number of bits), the receiver 201.i uses a quantizer 207.i and codebook 205.i to quantize the precoding information that is generated by the vector design module 204.i and/or CQI estimate module 206.i and that will be used by the transmitter in controlling signal transmission to the receiver. For example, in quantizing the codeword u, the receiver codebook 205.i may be used to store an indexed set of possible codewords u so that the codewords u generated by the vector design module 204.i can be used by the quantizer 207.i to retrieve an index from the limited feedback codebook 205.i and provide the retrieved index over a feedback channel (e.g., a low rate feedback channel 215) to the transmitter 210. Likewise, the CQI value(s) from the CQI estimate module 206.i may be quantized with a separate CQI quantizer 207.i into an index that is provided over a feedback channel (e.g., a low rate feedback channel 215) to the transmitter 210. Based on the indexed feedback, the dequantizer 220 at the transmitter 210 retrieves from the codebook 220 a matching codewords u and/or otherwise decodes the quantized CQI values for a particular receiver 201.i which are used to precode the transmission signal (e.g., $s_i$). While the quantizing and dequantizing functions are described separately, it will be appreciated that joint or shared codebook techniques may be used to jointly quantize and/or dequantize the codeword and CQI data being fed back. In this way, codebook-based feedback enables a variety of techniques, including but not limited to precoding, power allocation, and adaptive modulation and coding. While the present description is directed primarily to the example of performing precoding for downlink signal transmissions, it will be appreciated that precoding for uplink transmissions may also be implemented by having the transmitter 210 determine or estimate the uplink MIMO channel matrix information and use this information to generate a precoding index which is fed back to the receiver 201.i to control signal transmissions from the receiver 201.i to the transmitter 210.

In one embodiment, all the CQI values can be fed back to the transmitter through the feedback channel. However, to further reduce the feedback overhead that would otherwise be required to send back the full CQI values, each receiver may be configured to feed back a first CQI (representing the "zero interference" or "minimum interference" assumption) and a differential value Δ between the first and second CQIs (e.g., Δ=CQI2−CQI1), where the differential value Δ would require fewer bits than sending the entirety of the entire second CQI value. Thus, for a multi-user MIMO system where no more than two potentially interfering receivers will be paired together in a time-frequency resource block, each receiver 201.i will only need to feed back a first CQI value (ρ(K=1) for the zero-interference case) and a differential value Δ which can be used by the transmitter to determine a second CQI value (ρ(K=2) for the interference pair case). In this case, CQI2=CQI1+Δ, thus with this information the transmitter can calculate the two CQIs fed back by the receiver. In an alternate embodiment in which a minimum of two users are required to be scheduled, each receiver feeds back a first CQI corresponding to the case of minimum interference, that is assuming that K=2, or that there is one another interfering user. Note that in this embodiment, only one CQI corresponding to the K=2 case needs to be fed back in the 2×2 case. For a multi-user MIMO system where more than one potentially interfering receiver can be paired together in a time-frequency resource block, each CQI estimation module 206.$i$ may be configured to compute a plurality of CQI values for the zero-interference and various interference cases resulting from one or more receivers being in the same time-frequency resource block. With the example described above, CQI1=$\rho$(K=1), CQI2=$\rho$(K=2), CQI3=$\rho$(K=3), etc. To reduce the overhead that would be required to feed back the entirety of the CQI values, each CQI estimation module 206.$i$ may be configured to compute three differential values given by $\Delta_1$=CQI1−CQI2, $\Delta_2$=CQI1−CQI3, $\Delta_3$=CQI1−CQI4, and the information fed back consists of CQI1, $\Delta_1$, $\Delta_2$ and $\Delta_3$. In another embodiment, each CQI estimation module 206.$i$ may also be configured to compute an average differential value $\Delta_{avg}$ by taking the average of the differences between CQI1 and CQI2, CQI2 and CQI3, CQI3 and CQI4, etc. In equation form, the average differential value for up to three potentially interfering receivers in the same time-frequency block, $\Delta_{avg}$=((CQI2−CQI1)+(CQI3−CQI2)+(CQI4−CQI3))/3. By feeding back the first CQI value ($\rho$(K=1) for the zero-interference case) and an average differential value $\Delta_{avg}$, the transmitter 210 can determine a second CQI value ($\rho$(K=2) for the interference pair case) by adding the first CQI value and the average differential value $\Delta_{avg}$. Similarly, the transmitter 210 can determine a third CQI value ($\rho$(K=3) for the case where there are two other potentially interfering receivers in the same time-frequency block) by adding the first CQI value and twice the average differential value. In other words, CQI3=CQI1+2 $\Delta_{avg}$, and similarly, CQI4=CQI1+3 $\Delta_{avg}$. In an alternative embodiment, the average differential value $\Delta_{avg}$ can be calculated as $\Delta_{avg}$=((CQI2−CQI1)+(CQI3−CQI1)+(CQI4−CQI1))/6. In another embodiment where there are a minimum number of two scheduled users, each receiver feeds back the first CQI value corresponding to the case—that is $\rho$(K=2) is fed back as the main CQI. Additionally, a differential, $\Delta_{avg}$, enabling the transmitter/base station to estimate the CQI for cases K=3 and K=4 is fed back by each receiver. The $\Delta_{avg}$ may be calculated using a similar algorithm to the previous embodiment, such as by computing $\Delta_{avg}$=((CQI3−CQI2)+(CQI4−CQI3))/2 or $\Delta_{avg}$= ((CQI3−CQI2)+(CQI4−CQI2))/3. Note that the first CQI value to be fed back is CQI2. The transmitter/base station can thus estimate CQI3 and CQI4 using CQI3=CQI2+$\Delta_{avg}$, and CQI4=CQI2+2$\Delta_{avg}$.

Once the precoding information from a receiver 201.$i$— such as the selected codeword $u_i$ and CQI value(s)—are indexed and fed back to the transmitter 210 over the low rate feedback channel 215, the transmitter 210 decodes or dequantizes the indexed feedback information using a codebook-based dequantizer 220 which accesses a codebook to obtain the selected codeword $u_i$ and CQI value(s) for the receiver 201.$i$. As will be appreciated, the transmitter codebook is the same as the codebook 205.$i$ used at the receiver 201.$i$. The selected codeword $u_i$ is provided to the design module 222 which computes scheduling information and designs the transmit beamforming vector $w_i$. When the selected codeword computed by the receiver 201.$i$ represents the receiver's effective channel, $u_i = H_i v_i / \|H_i v_i\|$, the design module 222 at the transmitter 210 uses zero-forcing beamforming (ZFBF) (or variants thereof such as regularized zero-forcing beamforming) to design each transmit beamforming vector $w_i = \tilde{w}_i / \|\tilde{w}_i\|$ such that $$\tilde{w}_i^H u_j = \begin{cases} 1 & \text{if } i = j \\ 0 & \text{if } i \neq j \end{cases}. \qquad [6]$$

One possible solution to Equation 6 is given by:

$$\tilde{W} = X(X^H X)^{-1} \qquad [7]$$

where $X=[u_1 u_2 \ldots u_k]$. This ensures that interference to a user due to the other users' transmissions is zero.

Once the design module 222 designs the transmit beamforming vectors $w_i$ for each receiver 201.$i$, the design module 222 selects the appropriate CQI value from the possibilities CQIA and CQIB that corresponds to the transmit beamforming vectors $w_i$. For example, if the design module 222 designs the transmit beamforming vectors $w_i$ for a given receiver 201.$i$ so that it is not sharing a time-frequency resource block with any other receivers, then the first CQI value (corresponding to the zero interference/minimum interference case) is selected. On the other hand, if the transmit beamforming vectors $w_i$ for a given receiver 201.$i$ is designed so that it is does share a time-frequency resource block one or more additional receivers, then the appropriate multi-user CQI value is selected. Though FIG. 2 shows two CQI values (CQIA and CQIB) begin provided to the design module 222, it will be appreciated, that the CQI information may also be provided in the form of a first CQI value and a differential value or average differential value as described above.

For each receiver, the design module 222 provides the selected CQI value and the designed transmit beamforming vector $w_i$ to the CQI adjustment module 221 which computes a more accurate estimation CQI$_{adj}$ based on the actual transmit beamforming vectors $w_i$, as compared to the proposed transmit beamforming vectors $u_i$. In an example embodiment, the CQI adjustment module 221 computes the adjusted CQI value CQI$_{adj}$ using Equation 8:

$$\rho_{\text{eff}} = \rho(v_i) |w_i^H u|^2. \qquad [8]$$

The adjusted CQI value CQI$_{adj}$ is provided to the design module 222 for use in scheduling and appropriate coding/modulation selection in the adaptive modulation/coding module 223. In addition, the design module 222 provides the designed transmit beamforming vectors $w_i$ to the signal processor 224.$i$ where they are applied to precode the data input signal $s_i$ in the course of generating the transmit signal $x_i$.

Figure 3:
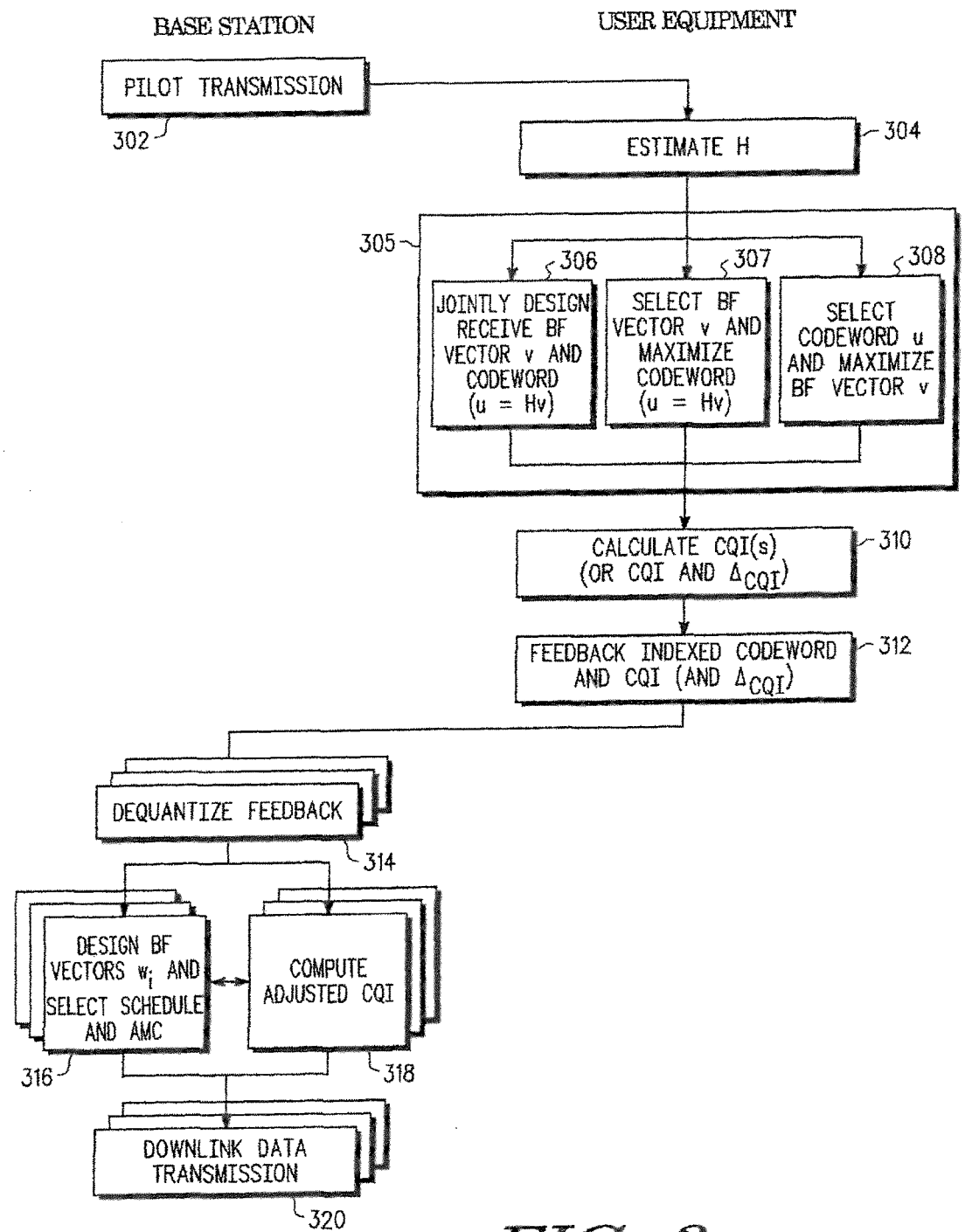
FIG. 3 depicts a first example flow for a precoding methodology for estimating, feeding back and adjusting channel quality information.

FIG. 3 depicts a generalized precoding methodology for estimating, feeding back and adjusting channel quality information. As a preliminary step, the MIMO transmission channel to a given receiver station is estimated by transmitting a pilot signal from the transmitter or base station (step 302) to the receiver or user equipment where the transmission channel is estimated (step 304). Generally, a transmission channel can be estimated by embedding a set of predetermined symbols, known as training symbols, at a base station and processing the training symbols at the user equipment to produce a set of initial channel estimates. In this example, the MIMO transmission channel being estimated at the user equipment may be characterized as a channel matrix H. The singular value decomposition (SVD) of the MIMO channel matrix H=U$\Lambda$V$^H$, where the matrix U is a left singular matrix representing the transmit signal direction, the matrix $\Lambda$ represents the strength (or gain) of the channel and the matrix V is a right singular matrix representing the receive signal direction.

In one of several embodiments, the user equipment selects its own receive beamforming vector v and computes the effective channel vector information by selecting a codeword u at step 305. The receive beamforming vector v and codeword u may be computed in a variety of different ways. For example, they may be jointly designed (step 306) by selecting the values v and u=Q(Hv), where Q(·) is some quantization function, that maximize a predetermined performance metric, such as a metric for estimating the SINR. Alternatively, a receive beamforming vector v may be selected on some unspecified basis, and the codeword u is then selected by maximizing the codeword value u=Q(Hv) for the receiver (step 307). In yet another alternative, a codeword u may be selected on some unspecified basis, and the receive beamforming vector then selected by maximizing v for the receiver (step 308). However determined, the receive beamforming vector v and codeword u may be used to calculate at least a first estimated CQI value (step 310). In a selected embodiment, a first CQI value is calculated for the case where there is no interference/minimum interference from other user equipments, and a second CQI value is calculated for the case where there is interference from other user equipments. In another selected embodiment, a first CQI value is calculated (for the case where there is no interference/minimum interference from other use equipment) along with a differential value representing the difference between the first CQI value and a second CQI value (which is calculated for the case where there is increased interference due to transmission to other user equipment).

In whichever form generated, the calculated CQI value(s) and codeword u are quantized or indexed and fed back to the base station at step 312. As disclosed herein, codebook-based indexing techniques may be used to quantize the CQI value(s) and codeword u where the base station and user equipment share the same codebook. At the base station, the feedback information from the user equipment is dequantized (step 314) into the original CQI value(s) and codeword u. The dequantized CQI value(s) and codeword u information is used by the base station to design the transmit beamforming vectors w and select an appropriate modulation and coding level in systems that implement adaptive modulation and coding (AMC) mechanisms (step 316). In addition, once the transmit beamforming vectors w are designed, the base station can apply a correction factor to the CQI value(s) from each user equipment, thereby greatly improving the quality of the CQI estimate. The corrected CQI value generated by the CQI adjustment module (at step 318) is also used by the scheduling process used to schedule users (step 316), as indicated by the two-way arrow between the scheduling block 316 and CQI adjustment block 318. Once the transmit beamforming vectors w and adjusted CQI values are computed, the precoding information is finalized and applied as part of the downlink data transmission (step 320).

Figure 4:
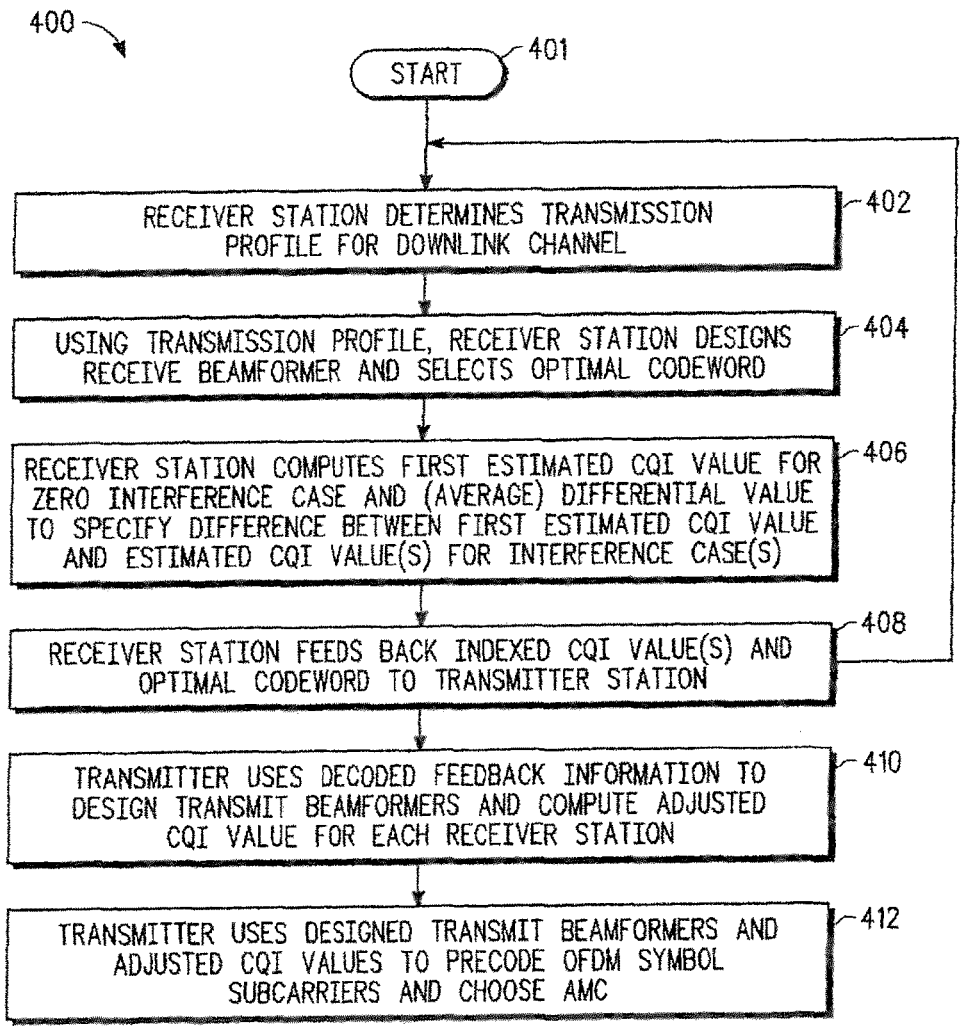
FIG. 4 depicts an example flow for accurately estimating CQI values at a base station for a multi-user MIMO system.

Selected embodiments of the present invention may also be illustrated with reference to FIG. 4, which depicts an example flow 400 for accurately estimating CQI values at a base station for a multi-user MIMO system. As depicted, the process starts (step 401) when the receiver station determines the transmission channel profile based on the estimated channel information for the MIMO transmission channel (step 402). Based on the channel profile information, the receiver station designs its receive beamformer v and selects an optimal codeword u=Q(Hv) (step 404) where Q(·) is a predetermined quantization function. In an example implementation, the vectors u and v may be jointly designed by selecting candidate values from a codebook of indexed precoding parameters that maximize a predetermined performance metric for estimating the receive SINR, where the metric is defined to reduce quantization errors resulting from the codebook-based selection process. To account for the fact that the receiver station does not have prior knowledge about potential interference from other receiver stations, the receiver station uses the computed vectors u and v to compute a first estimated CQI value for a minimum interference case (e.g., where there are no other interfering receiver stations sharing the same time-frequency resource block, or where there is a predetermined minimum number of other interfering receiver stations sharing the same time-frequency resource block) and one or more additional estimated CQI values for one or more additional interference cases (e.g., where there is more than the minimum number of receiving devices sharing a time-frequency resource block with the first receiving device) (step 406). Thus, it will be appreciated that the term "minimum" can refer to any predetermined number (such as 0, 1 or 2, for example). As described herein, the additional information for the multi-user interference cases may take the form of separate estimated CQI values for each possible interference case, or may take the form of a differential value between the first estimated CQI value and a second estimated CQI value for the paired interference case, or may take the form of an average differential value to specify the average difference between each of the sequential estimated CQI values, or may take the form of a weighted average differential value. After quantizing the CQI value(s) and optimal codeword u (such as by using a codebook of indexed values to retrieve a corresponding index), the indexed CQI value(s) and optimal codeword are then communicated as a feedback signal over the feedback control channel to the transmitter station (step 408) and the receiver repeats the foregoing sequence during the next design cycle (as indicated by the feedback line to step 402). At the transmitter, the feedback signal is decoded to generate the CQI value(s) and optimal codeword u for each receiver station (step 410). The transmitter uses each receiver's codeword u to design the transmit beamforming vectors w for each receiver and to otherwise schedule the users (step 410). In this context, the transmitter uses the designed transmit beamforming vector w for each receiver to select the appropriate CQI value, and a correction factor is applied to the selected CQI value is then for each receiver station (step 410). After the users are scheduled and CQI values adjusted, the transmitter applies the transmit beamforming vector w to the transmitting stream and uses the adjusted CQI value to choose an appropriate modulation and coding level (step 412).

By now it should be appreciated that there has been provided a method and system for transmitting signals and control information in a MIMO-SDMA communication system. At the receiver, channel state information is estimated for a transmission channel from a transmitting device to a first receiving device by receiving one or more signals. Based on the estimated channel state information, a codeword and a receive beamforming vector are generated for the transmission channel by using a predetermined receive SINR performance metric to select the codeword from a codebook and to compute the receive beamforming vector. In an example embodiment, the receive beamforming vector is generated by selecting a candidate receive beamforming vector $v_\alpha$ that maximizes a predetermined receive SINR performance metric that is defined as $$\rho(v_\alpha) = \frac{(P/K)|u^H H v_\alpha|^2}{1 + (K-1)(P/K)\|Hv_\alpha\|^2(1/N_t)\left\|u - \frac{Hv_\alpha}{\|Hv_\alpha\|}\right\|^2},$$

where P specifies a maximum transmit SNR, K specifies a number of multiplexed users, u is a candidate codeword being evaluated, H is a MIMO channel matrix for the transmission channel, $N_t$ specifies a number of transmit antennas at the transmitting device, and $v_\alpha$ is a candidate receive beamforming vector being evaluated as $v_\alpha = (\alpha v_o + (1-\alpha)v_F)/(\|(\alpha v_o + (1-\alpha)v_F)\|)$, where $0 \le \alpha \le 1$, where $F_F = (H^H H)^{-1} H^H u / \|(H^H H)^{-1} H^H u\|$) and $v_o = RSV_{max}(H)$. In another example embodiment, the codeword is generated by selecting a candidate codeword c from the codebook and receive beamforming vector $v_\alpha$ that maximize a predetermined receive SINR performance metric that is defined as $$\rho(c, v_\alpha) = \frac{(P/K)|c^H H v_\alpha|^2}{1 + (K-1)(P/K)\|Hv_\alpha\|^2(1/N_t)\left\|c - \frac{Hv_\alpha}{\|Hv_\alpha\|}\right\|^2},$$

where P specifies a maximum transmit SNR, K specifies a number of multiplexed users, c is a candidate codeword being evaluated, H is a MIMO channel matrix for the transmission channel, $v_\alpha$ is a candidate receive beamforming vector being evaluated, and $N_t$ specifies a number of transmit antennas at the transmitting device. In addition, the receiver generates a first estimated CQI value for the transmission channel based on the codeword and receive beamforming vector. In an example embodiment, the first estimated channel quality indicator is generated by calculating $$\rho(v) = \frac{(P/K)|u^H H v|^2}{1 + (K-1)(P/K)\|Hv\|^2(1/N_t)\left\|u - \frac{Hv}{\|Hv\|}\right\|^2},$$

where P specifies a maximum transmit SNR, K specifies a number of multiplexed users, u is the selected codeword, H is a MIMO channel matrix for the transmission channel, v is the designed receive beamforming vector, and $N_t$ specifies a number of transmit antennas at the transmitting device. In addition to generating the first estimated CQI value for a first assumed case where there is no interference/minimum interference from other receiving devices in a given time-frequency block, a second estimated CQI may be generated for a second assumed case where there is interference from one or more other receiving devices in a given time-frequency block. In addition or in the alternative, a differential value may be generated which specifies the difference between the first CQI and the second CQI. The codeword and first estimated channel quality indicator value (or differential values relating thereto) are quantized into a feedback index value which is transmitted to the transmitting device. At the transmitting device, an adjusted channel quality indicator $\rho_{eff} = \rho(v)|w^H u|^2$ is computed after designing a transmit beamforming vector w for the first receiving device, where $\rho(v)$ is the first estimated CQI and u is the selected codeword for the first receiving device.

In another form, there is disclosed a channel information feedback method for a multiple input, multiple output (MIMO) space division multiple access (SDMA) system. As described, a first receiving device estimates channel state information for a transmission channel from a transmitting device to the first receiving device by receiving one or more signals, and then generates a receive beamforming vector v for the transmission channel and a codeword u which represents a product of the receive beamforming vector v and a channel matrix H for the transmission channel. Based on the codeword u and receive beamforming vector v, the first receiving device generates a first estimated channel quality indicator (CQI) for the transmission channel (where the first estimated channel quality indicator is computed for a minimum interference case where there is a minimum number—e.g., zero or two—of receiving devices sharing a time-frequency resource block with the first receiving device) and a second estimated CQI for the transmission channel (where the second estimated channel quality indicator is computed for an additional interference case where there is more than the minimum number of receiving devices sharing a time-frequency resource block with the first receiving device). In an example implementation, the first estimated CQI is generated by calculating $$\rho(v) = \frac{(P/K)|u^H H v|^2}{1 + (K-1)(P/K)\|Hv\|^2(1/N_t)\left\|u - \frac{Hv}{\|Hv\|}\right\|^2},$$

where P specifies a maximum transmit SNR, K specifies a number of multiplexed users, u is the generated codeword, H is a MIMO channel matrix for the transmission channel, v is the generated receive beamforming vector, and $N_t$ specifies a number of transmit antennas at the transmitting device. Once the CQI values are generated, the first receiver device transmits feedback information to the transmitting device that is representative of the codeword u, and at least one of the first or second estimated channel quality indicators. For example, the codeword u and at least one of the first estimated channel quality indicator or the second estimated channel quality indicator may all be fed back to the transmitting device, either directly or in quantized form. In another example, the first receiver device generates a differential value between the first estimated channel quality indicator and the second estimated channel quality indicator, and then transmits feedback information to the transmitting device that is representative of the codeword u, the first estimated channel quality indicator and the differential value. In yet another example where a third estimated channel quality indicator is computed for a multi-interference case where there are two or more other receiving devices sharing a time-frequency resource block with the first receiving device, a weighted average differential value is generated by computing an average of a first difference (between the second estimated channel quality indicator and the first estimated channel quality indicator), and a second difference (between the third estimated channel quality indicator and the first estimated channel quality indicator). As will be appreciated, the approach can be extended to cover the generation and feedback of four or more estimated channel quality indicator values by the first receiver device. By transmitting feedback information that is representative of the codeword u, the first estimated channel quality indicator and the weighted average differential value, the transmitting device can extract the first, second and third estimated channel quality indicators from the feedback information. Stated more generally, when a plurality of estimated channel quality indicators are generated for the transmission channel for a corresponding plurality of interference cases, the first receiver device may select one of the estimated channel quality indicators as a reference CQI and then compute a differential value between the reference CQI and each of the remaining estimated channel quality indicators that were not selected. In addition, the first receiver device may compute an average differential value (or weighted average differential value) by computing an average of the differential values (or a weighted average of the differential values). By transmitting feedback information to the transmitting device that is representative of the codeword u, the reference CQI and the differential values—or the (weighted) average of the differential values—the transmitting device can decode the feedback information to obtain the codeword u. In addition, the transmitting device can extract all of the estimated channel quality indicators from the feedback information, and thereby compute an actual channel quality indicator for the first receiving device as a function of how many receiving devices will share a time-frequency resource block with the first receiving device. Using the codeword u, the transmitting device can design a transmit beamforming vector w for the first receiving device using any desired technique, and can then use the designed transmit beamforming vector w and the codeword u to update the actual channel quality indicator for the first receiving device.

In yet another form, there is disclosed a wireless communication method for using beamforming for a multiple input, multiple output (MIMO) space division multiple access (SDMA) system. As disclosed, the method is implemented at a receiver device which estimates a channel matrix H for a transmission channel from a transmitting device to the receiving device by receiving one or more signals. The receiver device then generates a receive beamforming vector v for the transmission channel and a codeword u which represents a product of the receive beamforming vector v and the channel matrix H for the transmission channel by using a predetermined channel quality indicator (CQI) metric. In a selected embodiment, the receive beamforming vector v and codeword u are jointly designed at the first receiving device by maximizing a predetermined CQI metric. For example, the receive beamforming vector v and codeword u may be jointly designed by maximizing a predetermined CQI metric comprising a receive SINR performance metric that is defined as $$\rho(v_i, u_i) = \frac{(P/K)|u_i^H H v_i|^2}{1 + (K-1)(P/K)\|Hv_i\|^2(1/N_t)\left\|u_i - \frac{Hv_i}{\|Hv_i\|}\right\|^2},$$

where P specifies a maximum transmit SNR, K specifies a number of multiplexed users, $u_i$ is a candidate codeword being evaluated, H is a MIMO channel matrix for the transmission channel, $v_i$ is a candidate receive beamforming vector being evaluated, and $N_t$ specifies a number of transmit antennas at the transmitter. In another embodiment, the codeword u is designed given a fixed receive beamforming vector v by maximizing a predetermined CQI metric. In yet another embodiment, the receive beamforming vector v is designed given a fixed codeword u by maximizing a predetermined CQI metric. In still further embodiments, the codeword u and receive beamforming vector v are generated by optimizing a predetermined CQI metric as a function of an assumed number of K interfering receiving devices. The receiver then transmits feedback information to the transmitting device that is representative of the codeword u for use in designing a transmit beamforming vector w for the receiver. This may be done by directly feeding back the codeword u, or by quantizing the codeword u into a feedback index value by selecting a codeword u from a pre-specified set of codewords in a codebook and retrieving a feedback index value corresponding to the selected codeword u, and then transmitting the feedback index value to the transmitting device for use in designing a transmit beamforming vector w for the first receiving device. In cases where the actual number of interfering devices or the transmit beamforming vector w is fed forward, the receiver can generate an adjusted receive beamforming vector v* by recomputing the predetermined CQI metric based on how many additional receiving devices are scheduled to share a time-frequency resource block with the first receiving device. For example, when information representative of the transmit beamforming vector w is fed forward to the receiver, the receiver may generate an adjusted receive beamforming vector $v_{adj}$ by selecting a candidate receive beamforming vector $v_{adj}$ that maximizes a predetermined receive SINR performance metric that is defined as $$\rho(v_{adj}) = \frac{(P/K)|w^H H v_{adj}|^2}{1 + (K-1)(P/K)\|Hv_{adj}\|^2(1/N_t)\left\|w - \frac{Hv_{adj}}{\|Hv_{adj}\|}\right\|^2},$$

where P specifies a maximum transmit SNR, K specifies a number of multiplexed users, w is the transmit beamforming vector for the first receiving device, H is a MIMO channel matrix for the transmission channel, $v_{adj}$ is a candidate receive beamforming vector being evaluated, and $N_t$ specifies a number of transmit antennas at the transmitting device. And when information representative of K* (which identifies how many receiving devices are scheduled to share a time-frequency resource block with the first receiving device), the receiver may generate an adjusted receive beamforming vector $v_{adj}$ by selecting a candidate receive beamforming vector $v_{adj}$ that maximizes a predetermined receive SINR performance metric that is defined as $$\rho(v_{adj}) = \frac{(P/K^*)|u^H H v_{adj}|^2}{1 + (K^*-1)(P/K^*)\|Hv_{adj}\|^2(1/N_t)\left\|u - \frac{Hv_{adj}}{\|Hv_{adj}\|}\right\|^2},$$

where P specifies a maximum transmit SNR, u is the generated codeword for the first receiving device, H is a MIMO channel matrix for the transmission channel, $v_{adj}$ is a candidate receive beamforming vector being evaluated, and $N_t$ specifies a number of transmit antennas at the transmitting device.

In still yet another form, there is provided a communication device for feeding back channel information and designing a receive beamformer in a MIMO-SDMA communication system. The disclosed communication device may include a vector design module for jointly designing a receive beamforming vector v and selecting a corresponding codeword u=Q(Hv) which are optimized using a predetermined performance metric for estimating an SINR value for a MIMO channel between a transmitter and the communication device. In a selected embodiment, the receive beamforming vector $v_i$ and codeword $u_t$ are jointly designed by maximizing a predetermined receive SINR performance metric that is defined as $$\rho(v_i, u_i) = \frac{(P/K)|u_i^H H v_i|^2}{1 + (K-1)(P/K)\|H v_i\|^2 (1/N_t) \left\| u_i - \frac{H v_i}{\|H v_i\|} \right\|^2},$$

where P specifies a maximum transmit SNR, K specifies a number of multiplexed users, $u_t$ is a candidate codeword being evaluated, H is a MIMO channel matrix for the transmission channel, $v_t$ is a candidate receive beamforming vector being evaluated, and $N_t$ specifies a number of transmit antennas at the transmitter. In addition, the communication device includes a CQI estimation module for computing a first estimated CQI and a second estimated CQI, where the first estimated CQI is computed for a zero interference/minimum interference case, and where the second estimated CQI is computed for an interference case (or a higher interference case) where there is interference from one or more other communication devices. In addition or in the alternative, the CQI estimation module generates a differential value between the first estimated CQI and the second estimated CQI. The communication device may also include a quantizer for quantizing the codeword u into a first feedback index value, and another quantizer for quantizing at least the first estimated channel quality indicator value into a second feedback index value. Stated more generally, CQI estimation module may generate a plurality of estimated channel quality indicators for the transmission channel for a corresponding plurality of interference cases, select one of the estimated channel quality indicators as a reference CQI, and then compute a differential value between the reference CQI and each of the remaining estimated channel quality indicators that were not selected. In addition, the CQI estimation module may compute an average differential value (or weighted average differential value) by computing an average of the differential values (or a weighted average of the differential values). By transmitting feedback information to the transmitter that is representative of the codeword u, the reference CQI and the differential values, or the (weighted) average of the differential values, the transmitter can decode the feedback information to obtain the codeword u. In addition, the transmitter can extract all of the estimated channel quality indicators from the feedback information, and thereby compute an actual channel quality indicator for the first receiving device as a function of how many receiving devices will share a time-frequency resource block with the first receiving device.

The methods and systems for efficiently providing accurate precoding in wireless, multi-user, multi-input, multiple output (MIMO) system having finite rate feedback as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, precoding the modulated signals, preconditioning the precoded signals, designing the transmit beamforming vectors, adjusting the CQI value(s), and so on) and/or at the receiver (e.g., recovering the transmitted signals, demodulating and decoding the recovered signals, designing the receive beamforming vectors, estimating the CQI value(s), and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various multi-user MIMO systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An apparatus comprising:
a memory element configured to store information; and
a processing element configured to use at least a portion of the information stored in the memory element to cause a wireless communication device to:
wirelessly communicate in a multiple input, multiple output (MIMO) space division multiple access (SDMA) communications mode;

receive one or more signals from a transmitting device;
determine a parameter related to a transmission channel, based at least on the one or more signals;
determine a receive beamforming vector for the transmission channel, and further determine a codeword as a function of a predetermined channel quality indicator metric; and
transmit feedback information to the transmitting device, wherein the feedback information is representative of at least the codeword.

2. The apparatus of claim 1, wherein the parameter corresponds to a channel matrix for the transmission channel.

3. The apparatus of claim 1, wherein the codeword represents a product of the receive beamforming vector and the parameter.

4. The apparatus of claim 1, wherein the processing element is configured to further cause the wireless communication device to:
jointly determine the receive beamforming vector and the codeword by maximizing the predetermined channel quality indicator metric.

5. The apparatus of claim 1, wherein the predetermined channel quality indicator metric comprises a receive signal-to-interference-and-noise ratio defined in terms of: a maximum transmit signal-to-noise ratio, a number of multiplexed users, a candidate codeword being evaluated, a candidate receive beamforming vector being evaluated, and a number of antennas at the transmitting device.

6. The apparatus of claim 1, wherein the one or more signals comprise a set of predetermined symbols embedded at the transmitting device.

7. The apparatus of claim 1, wherein the processing element is configured to cause the wireless communication device to determine the beamforming vector by maximizing the predetermined channel quality indicator metric according to a fixed beamforming vector.

8. The apparatus of claim 1, wherein the processing element is configured to cause the wireless communication device to determine the beamforming vector by maximizing the predetermined channel quality indicator metric according to a fixed codeword.

9. The apparatus of claim 1, wherein the processing element is configured to cause the wireless communication device to determine the codeword and the receive beamforming vector based on a maximized value of the predetermined channel quality indicator metric as a function of an assumed number of interfering devices.

10. A base station comprising:
radio circuitry configured to facilitate wireless communication of the base station in a multiple input, multiple output (MIMO) space division multiple access (SDMA) communications mode;
a processing element communicatively coupled to the radio circuitry and configured to:
transmit one or more signals to a wireless communication device;
receive feedback information from the wireless communication device, wherein the feedback information is representative of at least a codeword determined as a function of a predetermined channel quality indicator metric, wherein the codeword is further determined based on:
a parameter related to a transmission channel, wherein the parameter is determined based at least on the one or more signals; and
a receive beamforming vector for the transmission channel.

11. The base station of claim 10, wherein the codeword represents a product of the receive beamforming vector and the parameter.

12. The base station of claim 10, wherein the parameter corresponds to a channel matrix for the transmission channel.

13. The base station of claim 10, wherein the receive beamforming vector and the codeword are jointly determined based on a maximized value of the predetermined channel quality indicator metric.

14. The base station of claim 10, wherein the radio circuitry comprises one or more antennas;
wherein the predetermined channel quality indicator metric comprises a receive signal-to-interference-and-noise ratio (SINK) defined in terms of:
a maximum transmit signal-to-noise ratio;
a number of multiplexed users;
a candidate codeword being evaluated;
a candidate receive beamforming vector being evaluated; and
a number of antennas.

15. The base station of claim 10, wherein the processing element is further configured to embed a set of predetermined symbols in the one or more signals prior to transmitting the one or more signals.

16. The base station of claim 10, wherein the processing element is further configured to:
use a transmit beamforming vector different from the codeword;
adjust, based on the transmit beamforming vector, a channel quality indicator value corresponding to the wireless communication device; and
use the adjusted channel quality indicator value in performing adaptive modulation and coding on data to be transmitted by the base station.

17. A non-transitory memory element storing instructions executable by a processing element to:
receive one or more signals from a first wireless communication device at a second wireless communications device;
determine:
a parameter related to a transmission channel, based at least in part on the one or more signals;
a receive beamforming vector for the transmission channel; and
a codeword as a function of a predetermined channel quality indicator metric; and
transmit feedback information to the second wireless communication device, wherein the feedback information is representative of at least the codeword.

18. The non-transitory memory element of claim 17;
wherein the parameter corresponds to a channel matrix for the transmission channel;
wherein the codeword represents a product of the receive beamforming vector and the parameter; and
wherein the one or more signals comprise a set of predetermined symbols embedded at the second wireless communication device.

19. The non-transitory memory element of claim 17, wherein the instructions are further executable by a processing element to determine the codeword and the receive beamforming vector by optimizing the predetermined channel quality indicator metric as a function of an assumed number of interfering receiving devices.

20. The non-transitory memory element of claim 17, wherein the predetermined channel quality indicator metric comprises a receive signal-to-interference-and-noise ratio defined in terms of:
  a maximum transmit signal-to-noise ratio;
  a number of multiplexed users;
  a candidate codeword being evaluated;
  a candidate receive beamforming vector being evaluated;
  a number of transmit antennas at the second wireless communication device.

* * * * *